US008436165B2

(12) United States Patent
Nojiri et al.

(10) Patent No.: US 8,436,165 B2
(45) Date of Patent: May 7, 2013

(54) PROCESS FOR PRODUCING NONCRYSTALLINE CELLULOSE

(75) Inventors: Naoki Nojiri, Wakayama (JP); Masahiro Umehara, Wakayama (JP); Tomohito Kitsuki, Wakayama (JP); Munehisa Okutsu, Wakayama (JP); Keiichiro Tomioka, Wakayama (JP)

(73) Assignee: Kao Corporation, Tokyo (JP)

( * ) Notice: Subject to any disclaimer, the term of this patent is extended or adjusted under 35 U.S.C. 154(b) by 567 days.

(21) Appl. No.: 12/527,047

(22) PCT Filed: Feb. 15, 2008

(86) PCT No.: PCT/JP2008/052553
§ 371 (c)(1),
(2), (4) Date: Aug. 13, 2009

(87) PCT Pub. No.: WO2008/099929
PCT Pub. Date: Aug. 21, 2008

(65) Prior Publication Data
US 2010/0105891 A1 Apr. 29, 2010

(30) Foreign Application Priority Data

Feb. 16, 2007 (JP) ................. 2007-036742
Dec. 11, 2007 (JP) ................. 2007-319988
Dec. 13, 2007 (JP) ................. 2007-322004

(51) Int. Cl.
C07H 1/00 (2006.01)
C08B 1/00 (2006.01)
(52) U.S. Cl.
USPC .......... 536/124; 536/56; 536/76; 536/77
(58) Field of Classification Search .......... 536/56, 536/76, 77, 124
See application file for complete search history.

(56) References Cited

U.S. PATENT DOCUMENTS 3,817,983 A 6/1974 TenBoreck, Jr. et al.
4,415,124 A 11/1983 Carduck et al.
7,888,430 B2 * 2/2011 Oyama ................. 525/56

FOREIGN PATENT DOCUMENTS

| EP | 2 204 386 A1 | 7/2010 |
|---|---|---|
| EP | 2 210 905 A1 | 7/2010 |
| EP | 2 226 335 A1 | 9/2010 |
| JP | 62 236801 | 10/1987 |
| JP | 62236801 A * | 10/1987 |
| JP | 06 107701 | 4/1994 |
| JP | 06107701 A * | 4/1994 |
| JP | 2001 009316 | 1/2001 |
| JP | 2004 115700 | 4/2004 |
| JP | 2004115700 A * | 4/2004 |
| WO | WO 2009/084492 A1 | 7/2009 |

OTHER PUBLICATIONS

Quast et al, "Laboratory studies in comminution: part VI the specific rate of breakage for rod and ball milling of quartz", AusIMM Proceedings, vol. 303, p. 39, 1998.*
Extended European Search Report issued Nov. 5, 2010, in European Patent Application No. 08711383.3.
Office Action issued Mar. 23, 2011 in China Application No. 200880004725.0 (With English Translation).

* cited by examiner

Primary Examiner — Wu-Cheng Winston Shen
Assistant Examiner — Everett White
(74) Attorney, Agent, or Firm — Oblon, Spivak, McClelland, Maier & Neustadt, L.L.P.

(57) ABSTRACT

The present invention relates to a process for producing a decrystallized cellulose having a reduced cellulose I-type crystallinity from a cellulose-containing raw material in an efficient manner with an excellent productivity. In accordance with the present invention, there is provided a process for producing a decrystallized cellulose from a raw material comprising at least 20% by weight, based on the weight of the raw material excluding water contained therein, of a cellulose having a cellulose I-type crystallinity of more than 33% as calculated from the following formula:

Cellulose $I$-type Crystallinity (%) = $[(I_{22.6} - I_{18.5})/I_{22.6}] \times 100$ wherein $I_{22.6}$ is a diffraction intensity of a lattice plane (002 plane) as measured at a diffraction angle $2\theta$ of 22.6° in X-ray diffraction analysis; and $I_{18.5}$ is a diffraction intensity of an amorphous moiety as measured at a diffraction angle $2\theta$ of 18.5° in X-ray diffraction analysis, the process including the step of treating the cellulose-containing raw material using a media-type mill to reduce the cellulose I-type crystallinity of the cellulose to 33% or less, wherein the cellulose-containing raw material has a bulk density of from 100 to 500 kg/m³.

15 Claims, No Drawings

PROCESS FOR PRODUCING NONCRYSTALLINE CELLULOSE

FIELD OF THE INVENTION

The present invention relates to a process for producing decrystallized celluloses.

BACKGROUND OF THE INVENTION

Celluloses obtained by milling cellulose-containing raw materials such as pulps have been used as industrial materials such as raw materials of cellulose ethers, cosmetics, food stuffs and biomass materials. Among them, celluloses having a crystal structure thereof decrystallized are especially useful as these industrial materials.

For example, there is known the method of producing powdery pulps by mechanically treating sheet-like pulps using a mill (e.g., refer to Patent Documents 1 and 2). However, in these Patent Documents, there are no descriptions concerning the crystallinity of the celluloses.

Also, there is known the method of mechanically treating pulps using a mill to reduce the crystallinity of celluloses in the pulps (e.g., refer to Patent Documents 3 to 6).

In Examples 1 and 4 of Patent Document 3, there is disclosed the method of treating sheet-like pulps using a vibration ball mill or a twin-screw extruder.

In Examples 1 to 3 of Patent Document 4, there is disclosed the method of treating pulps using a ball mill.

In Examples 1 and 2 of Patent Document 5, there is disclosed the method of treating cellulose powders obtained by subjecting pulps to chemical treatments such as hydrolysis using a ball mill and further an air mill.

Patent Document 6 discloses the method of treating pulps kept dispersed in water using a media-type mill such as a vibration ball mill.

However, these methods have failed to achieve satisfactory efficiency and productivity when reducing the crystallinity of the celluloses.

Patent Document 1: JP 5-168969A
Patent Document 2: JP 2001-354701A
Patent Document 3: JP 62-236801A
Patent Document 4: JP 2003-64184A
Patent Document 5: JP 2004-331918A
Patent Document 6: JP 2005-68140A

SUMMARY OF THE INVENTION

The present invention relates to a process for producing a decrystallized cellulose from a raw material comprising at least 20% by weight, based on the weight of the raw material excluding water contained therein, of a cellulose having a cellulose I-type crystallinity of more than 33% as calculated from the following formula (1):

$$\text{Cellulose }I\text{-type Crystallinity (\%)}=[(I_{22.6}-I_{18.5})/I_{22.6}]\times 100 \quad (1)$$

wherein $I_{22.6}$ is a diffraction intensity of a lattice plane (002 plane) as measured at a diffraction angle 2θ of 22.6° in X-ray diffraction analysis; and $I_{18.5}$ is a diffraction intensity of an amorphous moiety as measured at a diffraction angle 2θ of 18.5° in X-ray diffraction analysis, the process including the step of treating the cellulose-containing raw material using a media-type mill to reduce the cellulose I-type crystallinity of the cellulose to 33% or less, wherein the cellulose-containing raw material has a bulk density of from 100 to 500 kg/m³.

DETAILED DESCRIPTION OF THE INVENTION

The present invention relates to a process for producing a decrystallized cellulose having a reduced cellulose I-type crystallinity from a cellulose-containing raw material in an efficient manner and with an excellent productivity.

The present inventors have found that a decrystallized cellulose having a reduced cellulose I-type crystallinity is produced in an efficient manner with an excellent productivity by the method of treating a cellulose-containing raw material having a bulk density of from 100 to 500 kg/m³ using a media-type mill.

Thus, the present invention relates to a process for producing a decrystallized cellulose from a raw material containing at least 20% by weight, based on the weight of the raw material excluding water contained therein, of a cellulose having a cellulose I-type crystallinity of more than 33% as calculated from the following formula (1);

$$\text{Cellulose }I\text{-type Crystallinity (\%)}=[(I_{22.6}-I_{18.5})/I_{22.6}]\times 100 \quad (1)$$

wherein $I_{22.8}$ is a diffraction intensity of a lattice plane (002 plane) as measured at a diffraction angle 2θ of 22.6° in X-ray diffraction analysis; and $I_{18.5}$ is a diffraction intensity of an amorphous moiety as measured at a diffraction angle 2θ of 18.5° in X-ray diffraction analysis, the process including the step of treating the cellulose-containing raw material using a media-type mill to reduce the cellulose I-type crystallinity of the cellulose to 33% or less, wherein the cellulose-containing raw material has a bulk density of from 100 to 500 kg/m³.

In the process for producing a decrystallized cellulose according to the present invention, the decrystallized cellulose having a reduced cellulose I-type crystallinity can be efficiently produced from the cellulose-containing raw material with an excellent productivity.

The present invention is described in detail below. In the present invention, the cellulose I-type crystallinity is occasionally referred to merely as a "crystallinity".

[Cellulose-Containing Raw Material]

The content of the cellulose, based on the weight of the raw material excluding water contained therein, of the cellulose-containing raw material used in the present invention, is at least 20% by weight, preferably 40% by weight or larger and more preferably 60% by weight or larger.

The cellulose content used in the present invention means a total content of cellulose and hemicellulose.

The cellulose-containing raw material used in the present invention is not particularly limited. Examples of the cellulose-containing raw material include various wood chips; pulps such as wood pulps produced from wood materials and cotton linter pulps obtained from fibers surrounding cotton seeds; papers such as news papers, corrugated boards, magazines and wood-free papers; stems or leaves of plants such as rice straws and corn stems; and shells of plants such as chaffs; palm shells and coconut shells.

In the commercially available pulps, the content of cellulose, based on the weight of the raw material excluding water contained therein, is generally from 75 to 99% by weight, and the pulps may also contain lignin, etc., as the other components. Further, the commercially available pulps usually have a cellulose I-type crystallinity of 60% or more.

The water content in the cellulose-containing raw material is preferably 20% by weight or smaller, more preferably 15% by weight or smaller and even more preferably 10% by weight or smaller. When the water content in the cellulose-containing raw material is 20% by weight or smaller, the raw material is readily milled, and the crystallinity thereof is readily reduced by the milling treatment.

[Cellulose I-Type Crystallinity]

The decrystallized cellulose produced according to the present invention has a reduced cellulose I-type crystallinity of 33% or less. The crystallinity is calculated from diffraction intensity values measured by X-ray diffraction analysis according to a Segal method, and is defined by the following calculation formula (1):

$$\text{Cellulose } I\text{-type Crystallinity } (\%) = [(I_{22.6} - I_{18.5})/I_{22.6}] \times 100 \quad (1)$$

wherein $I_{22.6}$ is a diffraction intensity of a lattice plane (002 plane) as measured at a diffraction angle 2θ of 22.6° in X-ray diffraction analysis; and $I_{18.5}$ is a diffraction intensity of an amorphous moiety as measured at a diffraction angle 2θ of 18.5° in X-ray diffraction analysis.

The cellulose having a crystallinity of 33% or less is enhanced in chemical reactivity. For example, when adding an alkali to such a cellulose upon producing cellulose ethers, conversion of the cellulose into an alkali cellulose can readily proceed, resulting in enhanced reaction conversion rate in an etherification reaction of the cellulose. From this viewpoint, the crystallinity of the decrystallized cellulose is preferably 20% or less, more preferably 10% or less and most preferably 0% indicating that no I-type crystal is detected upon analysis of the cellulose. Meanwhile, the cellulose I-type crystallinity defined by the above calculation formula (I) might be sometimes calculated as a negative value (minus value). The cellulose I-type crystallinity expressed by such a minus value is regarded as 0%.

The cellulose I-type crystallinity used herein means a ratio of the I-type crystal of cellulose on the basis of a whole amount of a crystalline region of the cellulose. Also, the cellulose I-type means a crystal structure of natural cellulose. The crystallinity of the cellulose has some relation to physical and chemical properties thereof. As the crystallinity is increased, the cellulose is increased in hardness, density, etc., owing to a high crystallinity and a less amorphous moiety thereof, but tends to be deteriorated in elongation, softness, solubility in water or solvents and chemical reactivity.

[Production of Decrystallized Cellulose]

In the process for producing the decrystallized cellulose according to the present invention, the cellulose-containing raw material having a bulk density of from 100 to 500 kg/m³ is used. When using the cellulose-containing raw material having a bulk density of less than 100 kg/m³, the cellulose-containing raw material is preferably subjected to pretreatments to adjust the bulk density thereof to the range of from 100 to 500 kg/m³ as specified above.

The pretreatments may be suitably selected depending upon the kind of cellulose-containing raw material used. For example, the pretreatments may include an extruder treatment, etc. Upon charging the cellulose-containing raw material into the extruder, the material is preferably coarsely milled into chips. The size of the cellulose-containing raw material coarsely milled into chips is preferably from 1 to 50 mm square and more preferably from 1 to 30 mm square. When using the coarsely milled chip-like cellulose-containing raw material having a size of from 1 to 50 mm square, the extruder treatment can be readily conducted in an efficient manner.

The cellulose-containing raw material may be coarsely milled into chips by the methods using a shredder or a rotary cutter. When using the rotary cutter, the size of the resultant chip-like cellulose-containing raw material may be controlled by varying a mesh size of a screen used therein. The mesh size of the screen is preferably from 1 to 50 mm and more preferably from 1 to 30 mm. When using the screen having a mesh size of 1 mm or more, the cellulose-containing raw material is prevented from suffering from flocculation, and exhibits an adequate bulkiness suitable for the subsequent extruder treatment, resulting in enhanced handling property thereof. When using the screen having a mesh size of 50 mm or less, the cellulose-containing raw material exhibits an adequate size suitable for the subsequent extruder treatment, resulting in reduced load on the extruder.

When treating the cellulose-containing raw material by the extruder, the resultant material can exhibit a desired bulk density. Further, when treating the cellulose-containing raw material by the extruder, a compression shear force may be applied to the cellulose-containing raw material to break a crystal structure of the cellulose and mill the cellulose-containing raw material into a powder.

In the method of mechanically milling the cellulose-containing raw material by applying a compression shear force thereto, if an impact-type mill which has been frequently employed in the conventional techniques, for example, a cutter mill, a hammer mill, a pin mill, etc., is used, the cellulose-containing raw material tends to suffer from flocculation and, therefore, very high bulkiness, resulting in poor handling property and deterioration in weight-based treating capability. On the other hand, the cellulose-containing raw material milled by using the extruder can exhibit desired bulkiness and average particle size, resulting in enhanced handling property thereof.

The type of the extruder may be either a single-screw type or a twin-screw type. From the viewpoint of enhancement in delivering capability, etc., among these apparatuses, the twin-screw extruder is preferably used.

As the twin-screw extruder, there may be used a conventionally known twin-screw extruder in which two screws are rotatably inserted into a cylinder. The rotational directions of the two screws in the twin-screw extruder may be either identical or reverse to each other. From the viewpoint of enhancement in delivering capability, etc., the screws are preferably rotated in the same direction.

The type of meshing of the screws in the extruder may be any of a complete meshing type, a partially meshing type, a de-meshing type. From the viewpoint of enhancement in treating capability, etc., the extruder of a complete meshing type or a partially meshing type is preferred.

From the viewpoint of applying a strong compression shear force to the cellulose-containing raw material, the extruder is preferably provided with a so-called kneading disk segment in any portion of the respective screws thereof. The kneading disk segment is constituted from a plurality of kneading disks which are continuously arranged in combination while offsetting their positions at a constant phase, for example, at intervals of 90°, and is capable of applying an extremely strong shear force to the cellulose-containing raw material with rotation of the screws by forcibly passing the raw material through a narrow gap between the kneading disks or between the kneading disk and the cylinder. The screw preferably has such a structure that the kneading disk segments and the screw segments are arranged in an alternate relation to each other. In the twin-screw extruder, the two screws are preferably identical in structure to each other.

Upon the treatment using the extruder, it is preferred that the cellulose-containing raw material, preferably the chip-like cellulose-containing raw material, is charged into the extruder and continuously treated therein. The shear rate used upon the treatment is preferably 10 sec$^{-1}$ or more, more preferably from 20 to 30000 sec$^{-1}$ and even more preferably from 50 to 3000 sec$^{-1}$. When the shear rate is 10 sec$^{-1}$ or more, the increase in bulk density of the cellulose-containing raw material effectively proceeds. The other treating conditions are not particularly limited. The treating temperature is preferably from 5 to 200° C.

The number of passes of the cellulose-containing raw material through the extruder may be only one (pass) to attain a sufficient effect. From the viewpoint of increasing a bulk density of the cellulose-containing raw material, if one pass treatment is unsatisfactory, 2 or more passes are preferably conducted. Also, in view of good productivity, the number of passes of the cellulose-containing raw material through the extruder is preferably from 1 to 10 (passes). When repeating the passes through the extruder, the coarse particles contained in the raw material are milled, thereby obtaining a powdery cellulose-containing raw material having a less fluctuation in particle size. When conducting 2 or more passes, a plurality of the extruders may be arranged in series in view of a high production capacity.

[Decrystallization Treatment]

In the present invention, the cellulose-containing raw material having a bulk density of from 100 to 500 kg/m$^3$ is treated using a media-type mill to reduce a cellulose I-type crystallinity of the cellulose contained therein to 33% or less. Thus, when treating the cellulose-containing raw material having a high bulk density using the media-type mill, the cellulose-containing raw material can be milled to reduce the crystallinity thereof, thereby efficiently performing decrystallization of the cellulose.

The bulk density of the cellulose-containing raw material fed to the mill is 100 kg/m$^3$ or more, preferably 120 kg/m$^3$ or more and more preferably 150 kg/m$^3$ or more. When the bulk density of the cellulose-containing raw material is 100 kg/m$^3$ or more, the cellulose-containing raw material has an adequate volume, resulting in improved handling property. Further, in such a case, the amount of the raw material charged into the mill can be increased, resulting in enhanced treating capacity of the mill. On the other hand, the upper limit of the bulk density of the cellulose-containing raw material fed to the mill is 500 kg/m$^3$ or less, preferably 400 kg/m$^3$ or less and more preferably 350 kg/m$^3$ or less from the viewpoints of a good handling property and a good productivity. From these viewpoints, the bulk density of the cellulose-containing raw material fed to the mill is from 100 to 500 kg/m$^3$, preferably from 120 to 400 kg/m$^3$ and more preferably from 150 to 350 kg/m$^3$.

Also, the average particle size of the cellulose-containing raw material fed to the mill is preferably 1 mm or smaller, more preferably 0.7 mm or smaller and even more preferably 0.5 mm or smaller. When feeding the cellulose-containing raw material having an average particle size of 1 mm or smaller to the mill, the cellulose-containing raw material can be efficiently dispersed in the mill, and milled into a desired particle size without requiring a prolonged period of time. On the other hand, the lower limit of the average particle size of the cellulose-containing raw material fed to the mill is preferably 0.01 mm or larger and more preferably 0.05 mm or larger in view of a good productivity. From these viewpoints, the average particle size of the cellulose-containing raw material fed to the mill is preferably from 0.01 to 1 mm, more preferably from 0.01 to 0.7 mm and even more preferably from 0.05 to 0.5 mm. Meanwhile, the bulk density and average particle size of the cellulose-containing raw material may be measured by the methods as described in Examples below.

In the present invention, the media-type mill is used. The media-type mills are classified into a container driving-type mill and a media agitating-type mill. Examples of the container driving-type mill include a ball mill, a vibration mill, a planetary mill and a centrifugal fluid mill. Among these container driving-type mills, from the viewpoints of a good grinding efficiency and a good productivity, preferred is the vibration mill. Examples of the media agitating-type mill include tower-type mills such as a tower mill; agitation tank-type mills such as an Attritor, an Aquamizer and a Sand grinder; flow tank-type mills such as a Visco mill and a Pearl mill; flow tube-type mills; annular-type mills such as a co-ball mill; and continuous-type dynamic mills. Among these media agitating-type mills, from the viewpoints of a high grinding efficiency and a good productivity, preferred are the agitation tank-type mills. When using the media agitating-type mills, the peripheral speed of agitation blades thereof is preferably from 0.5 to 20 m/s and more preferably from 1 to 15 m/s.

The above types of the mills will be understood by referring to "Progress of Chemical Engineering; 30th Collection; Control of Microparticles", Institute of Chemical Engineering, Tokai Division, Oct. 10, 1996, Maki-Shoten. The treating method may be either a batch method or a continuous method.

Examples of the media (grinding media) used in the mills include balls, rods and tubes. Among these media, from the viewpoints of a high grinding efficiency and a good productivity, preferred are balls and rods.

The material of the media used in the mills is not particularly limited. Examples of the material of the media include iron, stainless steel, alumina, zirconia, silicon carbide, silicon nitride and glass.

When using a vibration mill as the mill and balls as the media therefor, the outer diameter of the balls is preferably from 0.1 to 100 mm and more preferably from 0.5 to 50 mm. When the size of the balls lies within the above specified range, a desired grinding force can be attained, and the cellulose can be efficiently decrystallized without contamination of the cellulose-containing raw material owing to inclusion of fragments of the balls thereinto.

The filling ratio of the balls in the vibration mill varies depending upon the kind of vibration mill used, and is preferably from 10 to 97% and more preferably from 15 to 95%. When the filling ratio of the balls lies within the above specified range, the frequency of contact between the cellulose-containing raw material and the balls can be increased, and the grinding efficiency can be enhanced without inhibiting a motion of the media. The "filling ratio" used herein means a ratio of an apparent volume of the balls to a volume of an agitation portion of the vibration mill.

The treating time in the vibration mill using the balls varies depending upon the kind of the vibration mill used as well as kind, size and filling ratio of the balls and, therefore, is not particularly limited. From the viewpoint of reducing the crystallinity of the cellulose, the treating time is preferably from 0.01 to 50 h, more preferably from 0.05 to 20 h and even more preferably from 0.1 to 10 h. The treating temperature in the vibration mill using the balls is also not particularly limited, and is preferably from 5 to 250° C. and more preferably from 10 to 200° C. from the viewpoint of preventing heat deterioration.

Examples of the vibration mill using rods as the grinding media therefor include a vibration mill available from Chuo Kakohki Co., Ltd., a Vibro mill available from Uras Techno Co., Ltd., a small-size vibration rod mill "1045 Model" available from Yoshida Seisakusho Co., Ltd., a vibration cup mill "P-9 Model" available from Fritsch Inc., in Germany, and a small-size vibration mill "NB-O Type" available from Nitto Kagaku Co., Ltd. The treating method used in these vibration mills may be either a batch method or a continuous method.

The rods to be filled in the vibration mill are bar-like grinding media, and preferably each have a sectional shape such as a polygonal shape, e.g., a square shape and a hexagonal shape, a circular shape, an elliptical shape, etc.

The rods to be filled in the vibration mill each have an outer diameter of preferably from 0.5 to 200 mm, more preferably from 1 to 100 mm and even more preferably from 5 to 50 mm. The length of the respective rods is not particularly limited as far as it is shorter than the length of the container of the mill. When the size of the rods lies within the above specified range, a desired grinding force can be attained, and the cellulose can be efficiently decrystallized without contamination of the cellulose-containing raw material owing to inclusion of fragments of the balls thereinto.

The filling ratio of the rods in the vibration mill varies depending upon the kind of vibration mill used, and is preferably from 10 to 97% and more preferably from 15 to 95%. When the filling ratio of the rods lies within the above specified range, the frequency of contact between the cellulose and the rods can be increased, and the grinding efficiency thereof can be enhanced without inhibiting the motion of the grinding media. The "filling ratio" used herein means a ratio of the apparent volume of the rods to the volume of the vibration mill.

The treating time in the vibration mill using the rods varies depending upon the kind of vibration mill as well as kind, size and filling ratio of the rods and, therefore, is not particularly limited. From the viewpoint of reducing the crystallinity of the cellulose, the treating time is preferably from 0.01 to 50 h, more preferably from 0.05 to 20 h and even more preferably from 0.1 to 10 h. The treating temperature in the vibration mill using the rods is also not particularly limited, and is preferably from 5 to 250° C. and more preferably from 10 to 200° C. from the viewpoint of preventing heat deterioration.

When performing the above treating method, the decrystallized cellulose having a cellulose I-type crystallinity of 33% or less can be efficiently produced from the cellulose-containing raw material as a starting material. In addition, upon the treatment using the mill, the cellulose-containing raw material can be treated under a dry condition without allowing the cellulose-containing raw material to adhere on the inside of the mill.

The average particle size of the resultant decrystallized cellulose is preferably from 25 to 150 μm and more preferably from 30 to 100 μm from the viewpoints of a good chemical reactivity and a good handling property when using the decrystallized cellulose as an industrial raw material. In particular, the decrystallized cellulose having an average particle size of 25 μm or larger can be prevented from forming a so-called "undissolved lump or flour" when contacted with a liquid such as water.

EXAMPLES

The bulk density, average particle size and X-ray diffraction intensity of the cellulose-containing raw material and decrystallized cellulose as well as the content of cellulose therein were measured by the following methods.

(1) Measurement of Bulk Density

The bulk density was measured using a "Powder Tester" available from Hosokawa Micron Corporation. Upon the measurement, a sample was dropped through a chute on a screen being vibrated, and received in a standard container (having a capacity of 100 mL) to measure the weight of the sample in the container and calculate the bulk density thereof from the measured value. However, a flocculated sample was dropped through the chute without passing through the screen and received in the standard container (having a capacity of 100 mL) to measure the weight of the sample in the container and calculate the bulk density thereof from the measured value.

(2) Measurement of Average Particle Size

The average particle size was measured using a laser diffraction/scattering-type particle size distribution measuring device "LA-920" available from Horiba, Ltd. Upon the measurement, a sample was subjected to an ultrasonic treatment for 1 min prior to measuring the particle size thereof, and then by using water as a dispersing medium, a volume-based median diameter of the sample was measured at 25° C.

(3) Calculation of Crystallinity

The cellulose I-type crystallinity of a sample was calculated from a X-ray diffraction intensity thereof which was measured under the following conditions using a "Rigaku RINT 2500VC X-RAY diffractometer" available from Rigaku Corporation, according to the above calculation formula. Measuring Conditions:

X-ray source: Cu/Kα-radiation; tube voltage: 40 kV; tube current: 120 mA; measuring range: diffraction angle 2θ=5 to 45°; The sample to be measured was prepared by compressing pellets each having an area of 320 mm$^2$ and a thickness of 1 mm; X-ray scanning speed: 10°/min.

(4) Measurement of Water Content

The water content was measured at 150° C. using an infrared moisture meter "FD-610" available from Kett Electric Laboratory.

(5) Measurement of Cellulose Content

The cellulose content was measured according to a holocellulose determination method as described in "Handbook of Analytical Chemistry", Japan Institute of Analytical Chemistry, revised 4th edition, published on Nov. 30, 1991 from Maruzen Co., Ltd., pp. 1081-1082.

Example 1

[Shredder Treatment]

A sheet-like wood pulp as a cellulose-containing raw material ["Blue Bear Ultra Ether" available from Borregaard Inc., size: 800 mm×600 mm×1.5 mm; crystallinity: 81%; cellulose content (content of cellulose based on the weight of the raw material excluding water contained therein; this is similarly applied to the subsequent descriptions): 96% by weight; water content: 7% by weight] was cut by using a shredder "MSX2000-IVP440F" available from Meikoshokai Co., Ltd., to prepare a chipped pulp having a size of about 10 mm×5 mm×1.5 mm.

[Extruder Treatment]

The thus obtained chipped pulp was charged into a twin-screw extruder "EA-20" available from Suehiro EPM Corporation, at a feed rate of 2 kg/h, and passed therethrough one time (one pass) at a shear rate of 660 sec$^{-1}$ and a screw rotating speed of 300 rpm while flowing cooling water from outside therethrough. Meanwhile, the twin-screw extruder used was of a complete meshing and unidirectional rotation type in which the screws arranged in two rows were each provided with a screw segment having a screw diameter of 40 mm and a kneading disk segment constituted of a combination of 12 blocks of kneading disks offset from each other at intervals of 90°, and the two screws had the same construction. In addition, the temperature in the twin-screw extruder was raised to from 30 to 70° C. owing to heat generated upon the treatment.

As a result, it was confirmed that the pulp obtained after the extruder treatment had an average particle size of 120 μm and a bulk density of 219 kg/m³.

[Mill Treatment]

One hundred thirty grams of the resultant pulp was charged into a batch-type agitation tank mill "Sand Grinder" available from Igarashi Kikai Co., Ltd., (container capacity: 800 mL; 5 mmφ zirconia beads filled: 720 g; filling ratio: 25%; diameter of agitation blade: 70 mm). While flowing cooling water through a jacket of the container, the milling treatment was conducted for 2.5 h at a stirring speed of 2000 rpm, thereby obtaining a decrystallized cellulose. The temperature upon the treatment was in the range of from 30 to 70° C.

After completion of the milling treatment, no pulp deposited on the inner wall surface or bottom of the agitation tank mill was observed. The thus obtained decrystallized cellulose was taken out of the agitation tank mill and passed through a sieve having a mesh size of 75 μm, thereby obtaining 117 g of the decrystallized cellulose as an undersize product (corresponding to 90% by weight on the basis of the material charged). The resultant undersize product was subjected to measurements of an average particle size and X-ray diffraction intensity thereof, the crystallinity thereof was calculated from the measured X-ray diffraction intensity. The results are shown in Table 1.

Example 2

The same procedure as described in Example 1 was repeated except that a batch-type vibration mill "MB-1" available from Chuo Kakohki Co., Ltd., (container capacity: 2.8 L; 20 mmφ zirconia balls filled: 7.6 kg; filling ratio: 80%) was used in place of the batch-type agitation tank mill, and 200 g of the pulp as the cellulose-containing raw material was charged into the mill and treated therein at a vibration frequency of 20 Hz and a total vibration amplitude of 8 mm for 4 h, thereby obtaining a decrystallized cellulose. After completion of the milling treatment, no pulp deposited on an inner wall surface or a bottom of the vibration mill was observed. The thus obtained decrystallized cellulose was passed through a sieve having a mesh size of 75 μm, thereby obtaining 142 g of an undersize product of the decrystallized cellulose (corresponding to 71% by weight on the basis of the cellulose-containing raw material charged). The resultant undersize product was subjected to measurements of an average particle size and X-ray diffraction intensity thereof, and the crystallinity of the decrystallized cellulose was calculated from the measured X-ray diffraction intensity. The results are shown in Table 1.

Example 3

The same procedure as described in Example 1 was repeated except that a ball mill "Pot Mill ANZ-51S" available from Nitto Kagaku Co., Ltd., (container capacity: 1.0 L; 10 mmφ zirconia balls filled: 1.8 kg; filling ratio: 53%) was used in place of the batch-type agitation tank mill, and 100 g of the pulp as the cellulose-containing raw material was charged into the mill and treated therein at a rotating speed of 100 rpm for 48 h, thereby obtaining a decrystallized cellulose. After completion of the milling treatment, no pulp deposited on an inner wall surface or a bottom of the ball mill was observed. The thus obtained decrystallized cellulose was passed through a sieve having a mesh size of 75 μm, thereby obtaining 63 g of an undersize product of the decrystallized cellulose (corresponding to 63% by weight on the basis of the cellulose-containing raw material charged). The resultant undersize product was subjected to measurements of an average particle size and X-ray diffraction intensity thereof, and the crystallinity of the decrystallized cellulose was calculated from the measured X-ray diffraction intensity. The results are shown in Table 1.

TABLE 1

| | Examples | | |
|---|---|---|---|
| | 1 | 2 | 3 |
| Kind of cellulose-containing raw material | Pulp | Pulp | Pulp |
| Use or non-use of shredder treatment | Used | Used | Used |
| Twin-screw extruder treatment | | | |
| Use or non-use of treatment | Used | Used | Used |
| Shear rate (sec$^{-1}$) | 660 | 660 | 660 |
| Average particle size (μm)*[1] | 120 | 120 | 120 |
| Bulk density (kg/m³)*[1] | 219 | 219 | 219 |
| Mill treatment | | | |
| Use or non-use of treatment | Used | Used | Used |
| Kind of mill | Agitation tank mill | Vibration mill | ball mill |
| Kind of grinding media | 5 mmφ zirconia | 20 mmφ zirconia | 10 mmφ zirconia |
| Amount of pulp charged (g) | 130 | 200 | 100 |
| Treating time (h) | 2.5 | 4 | 48 |
| Evaluation | | | |
| Cellulose I-type Crystallinity (%) | 0 | 0 | 31 |
| Occurrence of deposit after milling*[2] | None | None | None |
| Ratio of weight passed through 75 μm sieve to whole weight charged into mill (% by weight)*[3] | 90 | 71 | 63 |
| Average particle size of decrystallized cellulose (μm) | 31 | 57 | 59 |

Note
*[1] Average particle size or bulk density of pulp after twin-screw extruder treatment
*[2] Presence or non-presence of pulp deposited within the mill after the mill treatment
*[3] Weight ratio of undersize product of decrystallized cellulose passing through a 75 μm sieve which was obtained after the mill treatment Example 4

A corrugated board (cellulose content: 84% by weight; water content: 7.2% by weight) as the cellulose-containing raw material was subjected to the same shredder treatment as described in Example 1 to obtain a chipped board having a size of about 10 mm×5 mm×1.5 mm.

Thus, the resultant chipped cellulose-containing raw material was subjected to the same extruder treatment as described in Example 1, thereby obtaining a powdered cellulose-containing raw material having a crystallinity of 71%.

Next, 100 g of the resultant powdered cellulose-containing raw material was charged into the same batch-type agitation tank mill as used in Example 1, and subjected to the same mill treatment as described in Example 1 except for conducting the treatment for 4 h. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Example 5

Rice straws (cellulose content: 55% by weight; water content: 8.0% by weight) as the cellulose-containing raw material were subjected to the same treatment using the twin-screw extruder as described in Example 4 except for previously subjecting the rice straws to no shredder treatment, thereby obtaining a powdered cellulose-containing raw material having a crystallinity of 54%.

Next, the resultant powdered cellulose-containing raw material was subjected to the same mill treatment using the batch-type agitation tank mill as described in Example 4. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Example 6

Chaffs (cellulose content: 60% by weight; water content: 13.6% by weight) as the cellulose-containing raw material were subjected to the same twin-screw extruder treatment as described in Example 4 except for previously subjecting the chaffs to no shredder treatment, thereby obtaining a powdered cellulose-containing raw material having a crystallinity of 47%.

Next, the resultant powdered cellulose-containing raw material was subjected to the same mill treatment using the batch-type agitation tank mill as described in Example 4 except for conducting the treatment for 2.5 h. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Example 7

The corrugated board used in Example 4 as the cellulose-containing raw material was successively subjected to the same shredder treatment and twin-screw extruder treatment as described in Example 4, thereby obtaining a powdered cellulose-containing raw material having a crystallinity of 71%.

Next, the resultant powdered cellulose-containing raw material was subjected to the same mill treatment using the batch-type agitation tank mill under the same conditions as used in Example 6. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Example 8

A wood-free paper (cellulose content: 70% by weight or more; water content: 5.7% by weight) as the cellulose-containing raw material was successively subjected to the same shredder treatment and twin-screw extruder treatment as described in Example 4, thereby obtaining a powdered cellulose-containing raw material having a crystallinity of 71%.

Next, the resultant powdered cellulose-containing raw material was subjected to the mill treatment using the batch-type agitation tank mill under the same conditions as used in Example 6. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Example 9

A news paper (cellulose content: 83% by weight; water content: 7.7% by weight) as the cellulose-containing raw material was successively subjected to the same shredder treatment and twin-screw extruder treatment as described in Example 4, thereby obtaining a powdered cellulose-containing raw material having a crystallinity of 56%.

Next, the resultant powdered cellulose-containing raw material was subjected to the mill treatment using the batch-type agitation tank mill under the same conditions as used in Example 6. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Example 10

The chaffs used in Example 6 as the cellulose-containing raw material were subjected to the same twin-screw extruder treatment, thereby obtaining a powdered cellulose-containing raw material.

Next, the same mill treatment as described in Example 2 was conducted except for charging 100 g of the above obtained powdered cellulose-containing raw material to the batch-type vibration mill used in Example 2. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Examples 11 and 12

The rice straws used in Example 5 (Example 11) and the news paper used in Example 9 (Example 12) as the cellulose-containing raw materials were subjected to the same twin-screw extruder treatment (Example 11) and the same shredder treatment and twin-screw extruder treatment (Example 12), respectively, thereby obtaining powdered cellulose-containing raw materials.

Next, the resultant powdered cellulose-containing raw materials were respectively subjected to the same mill treatment using the batch-type vibration mill as conducted in Example 10. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

Example 13

The same shredder treatment and twin-screw extruder treatment as described in Example 4 were conducted except for using a mixture of magazines ("VoCE" published from Kodansha, Ltd., "With" published from Kodansha, Ltd. and "MORE" published from Shueisha Inc.; cellulose content: 60% by weight or more; water content: 4.5% by weight) as a cellulose-containing raw material, thereby obtaining a powdered cellulose-containing raw material. The crystallinity of the powdered cellulose-containing raw material thus obtained after the twin-screw extruder treatment was 67%.

Next, the resultant powdered cellulose-containing raw material was subjected to the same mill treatment using the batch-type agitation tank mill as described in Example 4 except for conducting the treatment for 5 h. The resultant milled product was passed through a sieve having a mesh size of 75 μm, and the obtained undersize product was subjected to measurements of an average particle size and X-ray diffraction intensity thereof. The crystallinity of the product was calculated from the measured X-ray diffraction intensity. The results are shown in Table 2.

TABLE 2

|  | Examples | | | | |
|---|---|---|---|---|---|
|  | 4 | 5 | 6 | 7 | 8 |
| Kind of cellulose-containing raw material | Corrugated board | Rice straws | Chaffs | Corrugated board | Wood-free paper |
| Use or non-use of shredder treatment | Used | Non-used | Non-used | Used | Used |
| Twin-screw extruder treatment | | | | | |
| Use or non-use of treatment | Used | Used | Used | Used | Used |
| Shear rate (sec$^{-1}$) | 660 | 660 | 660 | 660 | 660 |
| Average particle size (μm)*$^1$ | 93 | 82 | 85 | 93 | 71 |
| Bulk density (kg/m$^3$)*$^1$ | 216 | 339 | 380 | 216 | 274 |
| Mill treatment | | | | | |
| Use or non-use of treatment | Used | Used | Used | Used | Used |
| Kind of mill | Agitation tank mill | Agitation tank mill | Agitation tank mill | Agitation tank mill | Agitation tank mill |
| Kind of grinding media | 5 mmφ zirconia | 5 mmφ zirconia | 5 mmφ zirconia | 5 mmφ zirconia | 5 mmφ zirconia |
| Amount of raw material charged (g) | 100 | 100 | 100 | 100 | 100 |
| Treating time (h) | 4 | 4 | 2.5 | 2.5 | 2.5 |
| Properties of raw material after milling | | | | | |
| Cellulose I-type Crystallinity (%) | 0 | 8 | 21 | 29 | 25 |
| Occurrence of deposit after milling*$^2$ | None | None | None | None | None |
| Ratio of weight passed through 75 μm sieve to whole weight charged into mill (% by weight)*$^3$ | 85 | 85 | 93 | 81 | 86 |
| Average particle size (μm) | 24 | 28 | 22 | 23 | 28 |

|  | Examples | | | | |
|---|---|---|---|---|---|
|  | 9 | 10 | 11 | 12 | 13 |
| Kind of cellulose-containing raw material | News paper | Chaffs | Rice straws | News paper | Magazines |
| Use or non-use of shredder treatment | Used | Non-used | Non-used | Used | Used |
| Twin-screw extruder treatment | | | | | |
| Use or non-use of treatment | Used | Used | Used | Used | Used |
| Shear rate (sec$^{-1}$) | 660 | 660 | 660 | 660 | 660 |
| Average particle size (μm)*$^1$ | 61 | 85 | 82 | 61 | 72 |
| Bulk density (kg/m$^3$)*$^1$ | 303 | 380 | 339 | 303 | 431 |
| Mill treatment | | | | | |
| Use or non-use of treatment | Used | Used | Used | Used | Used |
| Kind of mill | Agitation tank mill | Vibration mill | Vibration mill | Vibration mill | Agitation tank mill |

TABLE 2-continued

| Kind of grinding media | 5 mmφ zirconia | 20 mmφ zirconia | 20 mmφ zirconia | 20 mmφ zirconia | 5 mmφ zirconia |
|---|---|---|---|---|---|
| Amount of raw material charged (g) | 100 | 100 | 100 | 100 | 100 |
| Treating time (h) | 2.5 | 4 | 4 | 4 | 5 |
| Properties of raw material after milling | | | | | |
| Cellulose I-type Crystallinity (%) | 26 | 15 | 8 | 0 | 4 |
| Occurrence of deposit after milling*[2] | None | None | None | None | None |
| Ratio of weight passed through 75 μm sieve to whole weight charged into mill (% by weight)*[3] | 86 | 71 | 84 | 75 | 85 |
| Average particle size (μm) | 23 | 39 | 29 | 42 | 24 |

Note
*[1]Average particle size or bulk density of raw material after the twin-screw extruder treatment
*[2]Presence or non-presence of raw material deposited within the mill after the mill treatment
*[3]Weight ratio of undersize product of raw material passing through a 75 μm sieve which was obtained after the mill treatment

Comparative Example 1

The same procedure as described in Example 1 was repeated except for subjecting the pulp to the shredder treatment and then to the twin-screw extruder treatment, but no mill treatment was conducted, thereby obtaining a powdered pulp. The resultant powdered pulp was subjected to measurements of a bulk density, an average particle size and an X-ray diffraction intensity thereof. The crystallinity of the obtained product was calculated from the measured X-ray diffraction intensity. The results are shown in Table 3.

Comparative Example 2

The same shredder treatment as described in Example 1 was conducted to obtain a chipped pulp. Next, the resultant chipped pulp was charged into the batch-type agitation tank mill without previously subjecting the pulp to the extruder treatment. However, the amount of the chipped pulp capable of being charged into the mill was only 65 g which was one half of the pulp charged in Example 1, owing to a high bulkiness thereof. After completion of the charging, the chipped pulp was subjected to the treatment using the batch-type agitation tank mill under the same conditions as used in Example 1, thereby obtaining a powdered pulp. As a result, it was confirmed that after the treatment, the pulp deposited on the bottom of the agitation tank mill was observed. The thus obtained powdered pulp was passed through a sieve having a mesh size of 75 μm, thereby obtaining 16.9 g of the powdered pulp as an undersize product (corresponding to 26.0% by weight on the basis of the material charged). The resultant undersize product was subjected to measurements of an average particle size and an X-ray diffraction intensity thereof, and the crystallinity of the product was calculated from the measured X-ray diffraction intensity. The results are shown in Table 3.

Comparative Example 3

The same shredder treatment as described in Example 1 was conducted to obtain a chipped pulp. Next, 500 g of the resultant chipped pulp was charged into a cutter mill "POWER MILL P-02S Model" available from Dalton Co., Ltd., without previously subjecting the pulp to the extruder treatment, and treated therein at a rotating speed of 3000 rpm for 0.5 h. The obtained pulp was in the form of a flocculated weight having a bulk density of 33 kg/m$^3$. Next, the flocculated pulp was charged into the batch-type agitation tank mill. However, the amount of the flocculated pulp capable of being charged into the mill was only 30 g owing to a high bulkiness thereof. After completion of the charging, the flocculated pulp was subjected to the treatment using the batch-type agitation tank mill under the same conditions as used in Example 1, thereby obtaining a powdered pulp. As a result, it was confirmed that after the treatment, no pulp deposited on the inside of the agitation tank mill was observed. The thus obtained powdered pulp was passed through a sieve having a mesh size of 75 μm, thereby obtaining 23.4 g of the powdered pulp as an undersize product (corresponding to 78.0% by weight on the basis of the material charged). The resultant undersize product was subjected to measurements of an average particle size and an X-ray diffraction intensity thereof, and the crystallinity of the product was calculated from the measured X-ray diffraction intensity. The results are shown in Table 3.

Comparative Example 4

The same shredder treatment as described in Example 1 was conducted to obtain a chipped pulp. Next, 100 g of the resultant chipped pulp was charged into a ball mill "Pot Mill ANZ-51S" available from Nitto Kagaku Co., Ltd., (container capacity: 1.0 L; 10 mmφ zirconia balls filled: 1.8 kg; filling ratio: 53%), and treated using the ball mill under the same conditions as used in Example 1 except for conducting the treatment at a rotating speed of 100 rpm for 48 h. It was confirmed that the pulp was not powdered, and still kept substantially in a chipped condition. The crystallinity of the obtained pulp was calculated from the measured X-ray diffraction intensity thereof by the method described above. The results are shown in Table 3.

Comparative Example 5

The same shredder treatment as described in Example 1 was conducted to obtain a chipped pulp. Next, 500 g of the resultant chipped pulp was charged into a cutter mill "POWER MILL P-02S Model" available from Dalton Co., Ltd., and treated therein at a rotating speed of 3000 rpm for 0.5 h. As a result, the resultant milled product was flocculated, thereby failing to obtain a decrystallized cellulose. The crystallinity of the obtained milled product was calculated from the measured X-ray diffraction intensity thereof. The results are shown in Table 3.

Comparative Example 6

The same shredder treatment as described in Example 1 was conducted to obtain a chipped pulp. Next, 500 g of the resultant chipped pulp was charged into a hammer mill "SAMPLE-MILL" available from Dalton Co., Ltd., and treated therein at a rotating speed of 13500 rpm for 0.5 h. As a result, the resultant milled product was flocculated, thereby failing to obtain a decrystallized cellulose. The crystallinity of the obtained milled product was calculated from the measured X-ray diffraction intensity thereof by the method as described above. The results are shown in Table 3.

Comparative Example 7

The same shredder treatment as described in Example 1 was conducted to obtain a chipped pulp. Next, 500 g of the resultant chipped pulp was charged into a pin mill "KOLLOPLEX" available from Hosokawa Micron Corporation, and treated therein at a rotating speed of 13000 rpm for 0.25 h. As a result, the resultant milled product was flocculated, thereby failing to obtain a decrystallized cellulose. The crystallinity of the obtained milled product was calculated from the measured X-ray diffraction intensity thereof by the method described above. The results are shown in Table 3.

TABLE 3

|  | Comparative Example | | |
| --- | --- | --- | --- |
|  | 1 | 2 | 3 |
| Kind of cellulose-containing raw material | Pulp | Pulp | Pulp |
| Use or non-use of shredder treatment | Used | Used | Used |
| Twin-screw extruder treatment | | | |
| Use or non-use of treatment | Used | Non-used | Non-used |
| Shear rate (sec$^{-1}$) | 660 | — | — |
| Average particle size (μm) | 120*1 | — | — |
| Bulk density (kg/m$^3$) | 219*1 | — | 33*2 |
| Mill treatment | | | |
| Use or non-use of treatment | Non-used | Used | Used |
| Kind of mill | — | Agitation tank mill | Agitation tank mill |
| Kind of grinding media | — | 5 mmφ zirconia | 5 mmφ zirconia |
| Amount of pulp charged (g) | — | 65 | 30 |
| Treating time (h) | — | 2.5 | 2.5 |
| Evaluation | | | |
| Cellulose I-type Crystallinity (%) | 68 | 0 | 0 |
| Occurrence of deposit*3 | — | Occurred | None |
| Ratio of weight passed through 75 μm sieve to whole weight charged into mill (% by weight)*4 | — | 26 | 78 |
| Average particle size of raw material after milling (μm) | — | 38 | 23 |

|  | Comparative Examples | | | |
| --- | --- | --- | --- | --- |
|  | 4 | 5 | 6 | 7 |
| Kind of cellulose-containing raw material | Pulp | Pulp | Pulp | Pulp |
| Use or non-use of shredder treatment | Used | Used | Used | Used |
| Twin-screw extruder treatment | | | | |
| Use or non-use of treatment | Non-used | Non-used | Non-used | Non-used |
| Shear rate (sec$^{-1}$) | — | — | — | — |
| Average particle size (μm) | — | — | — | — |
| Bulk density (kg/m$^3$) | — | — | — | — |
| Mill treatment | | | | |
| Use or non-use of treatment | Used | Used | Used | Used |
| Kind of mill | ball mill | Cutter mill | Hammer mill | Pin mill |
| Kind of grinding media | 10 mmφ zirconia | — | — | — |
| Amount of pulp charged (g) | 100 | 500 | 500 | 500 |
| Treating time (h) | 48 | 0.5 | 0.5 | 0.25 |

TABLE 3-continued

| | Evaluation | | | |
|---|---|---|---|---|
| Cellulose I-type Crystallinity (%) | 73 | 78 | 74 | 75 |
| Occurrence of deposit*[3] | — | — | — | — |
| Ratio of weight passed through 75 μm sieve to whole weight charged into mill (% by weight)*[4] | — | — | — | — |
| Average particle size of raw material after milling (μm) | (Almost chip-like) | (Flocculated) | (Flocculated) | (Flocculated) |

Note
*[1]Average particle size or bulk density of pulp after the twin-screw extruder treatment
*[2]Bulk density of raw material after the cutter mill treatment
*[3]Presence or non-presence of pulp deposited within the mill after the mill treatment
*[4]Weight ratio of undersize product of the milled product passing through a 75 μm sieve which was obtained after the mill treatment Comparative Examples 8 to 13

The chaffs used in Example 6 (Comparative Example 8) and the rice straws used in Example 5 (Comparative Example 10) were respectively used as the cellulose-containing raw materials, and subjected to the same twin-screw extruder treatment as described above.

In addition, the corrugated board used in Example 4 (Comparative Example 9), the magazines used in Example 13 (Comparative Example 11), the wood-free paper used in Example 8 (Comparative Example 12) and the news paper used in Example 9 (Comparative Example 13) were respectively used as the cellulose-containing raw materials, and successively subjected to the same shredder treatment and twin-screw extruder treatment as described above.

The powdered cellulose-containing raw materials obtained after the twin-screw extruder treatment were subjected to measurements of a bulk density, an average particle size and an X-ray diffraction intensity thereof, and the crystallinity of each of the obtained materials was calculated from the measured X-ray diffraction intensity thereof. The results are shown in Table 4.

Comparative Example 14

The wood-free paper used in Example 8 was used as the cellulose-containing raw material, and subjected to the same shredder treatment as described above. Next, 500 g of the resultant coarsely milled product was charged into a cutter mill "POWER MILL P-02S Model" available from Dalton Co., Ltd., without previously subjecting the product to the extruder treatment, and treated therein at a rotating speed of 3000 rpm for 0.5 h. The obtained cellulose-containing raw material was in the form of a flocculated mass having a bulk density of 32 kg/m$^3$. Next, the flocculated cellulose-containing raw material was charged into the batch-type agitation tank mill. However, the amount of the flocculated raw material capable of being charged into the mill was only 22 g owing to a high bulkiness thereof. After completion of the charging, the flocculated raw material was subjected to the treatment using the batch-type agitation tank mill under the same conditions as used in Example 1, thereby obtaining a milled product. The thus obtained milled product was passed through a sieve having a mesh size of 75 μm. The resultant undersize product of the milled product was subjected to measurements of an average particle size and an X-ray diffraction intensity thereof, and the crystallinity of the product was calculated from the measured X-ray diffraction intensity. The results are shown in Table 4.

Comparative Example 15

The news paper used in Example 9 was used as the cellulose-containing raw material, and subjected to the same shredder treatment as described above. Next, the resultant coarsely milled product was subjected to the same treatment using the cutter mill and then to the same treatment using the batch-type agitation tank mill as described in Comparative Example 14. As a result, it was confirmed that the cellulose-containing raw material obtained after the treatment using the cutter mill was in the form of a flocculated mass having a bulk density as high as 32 kg/m$^3$, and the amount of the flocculated raw material capable of being charged into the batch-type agitation tank mill was only 23 g owing to a high bulkiness thereof. The thus obtained milled product was passed through a sieve having a mesh size of 75 μm. The resultant undersize product of the milled product was subjected to measurements of an average particle size and an X-ray diffraction intensity thereof, and the crystallinity of the product was calculated from the measured X-ray diffraction intensity. The results are shown in Table 4.

Comparative Example 16

The corrugated board used in Example 4 was used as the cellulose-containing raw material, and subjected to the same shredder treatment as described above. Next, the resultant coarsely milled product was subjected to the same treatment using the cutter mill and then to the same treatment using the batch-type agitation tank mill as described in Comparative Example 14. As a result, it was confirmed that the cellulose-containing raw material obtained after the treatment using the cutter mill was in the form of a flocculated mass having a bulk density as high as 33 kg/m$^3$, and the amount of the flocculated raw material capable of being charged into the batch-type agitation tank mill was only 20 g owing to a high bulkiness thereof. The thus obtained milled product was passed through a sieve having a mesh size of 75 μm. The resultant undersize product of the milled product was subjected to measurements of an average particle size and an X-ray diffraction intensity thereof, and the crystallinity of the product was calculated from the measured X-ray diffraction intensity. The results are shown in Table 4.

Comparative Examples 17 and 18

The news paper used in Example 9 (Comparative Example 17) and the corrugated board used in Example 4 (Comparative Example 18) were respectively used as the cellulose-containing raw materials, and subjected to the same shredder treatment as described above.

Next, 500 g of the resultant coarsely milled products were charged into a cutter mill "POWER MILL P-02S Model" available from Dalton Co., Ltd., and treated therein at a rotating speed of 3000 rpm for 1.5 h. As a result, the resultant milled products were flocculated, thereby failing to obtain a decrystallized cellulose. The crystallinity of each of the obtained milled products was calculated from the measured X-ray diffraction intensity thereof. The results are shown in Table 4.

Comparative Examples 19 and 20

The rice straws used in Example 5 (Comparative Example 19) and the chaffs used in Example 6 (Comparative Example 20) were respectively used as the cellulose-containing raw materials.

Next, the cellulose-containing raw materials were subjected to the treatment using the cutter mill under the same conditions as used in Comparative Example 17 except for conducting the treatment for 0.5 h. As a result, it was confirmed that coarse particles were contained in the resultant milled products, thereby failing to obtain a decrystallized cellulose. The crystallinity of each of the obtained milled products was calculated from the measured X-ray diffraction intensity thereof. The results are shown in Table 4.

Comparative Examples 21 to 23

The news paper used in Example 9 (Comparative Example 21), the corrugated board used in Example 4 (Comparative Example 22) and the wood-free paper used in Example 8 (Comparative Example 23) were respectively used as the cellulose-containing raw materials, and subjected to the same shredder treatment as described above.

Next, 500 g of each of the resultant coarsely milled products were charged into a hammer mill "SAMPLE-MILL" available from Dalton Co., Ltd., and treated therein at a rotating speed of 13500 rpm for 0.5 h. As a result, the obtained milled products were flocculated, thereby failing to obtain a decrystallized cellulose. The crystallinity of each of the obtained milled products was calculated from the measured X-ray diffraction intensity thereof. The results are shown in Table 4.

TABLE 4

| | Comparative Examples | | | | |
| --- | --- | --- | --- | --- | --- |
| | 8 | 9 | 10 | 11 | 12 |
| Kind of cellulose-containing raw material | Chaffs | Corrugated board | Rice straws | Magazines | Wood-free paper |
| Use or non-use of shredder treatment | Non-used | Used | Non-used | Used | Used |
| Twin-screw extruder treatment | | | | | |
| Use or non-use of treatment | Used | Used | Used | Used | Used |
| Shear rate ($sec^{-1}$) | 660 | 660 | 660 | 660 | 660 |
| Average particle size (μm) | 85*[1] | 93*[1] | 82*[1] | 72*[1] | 71*[1] |
| Bulk density ($kg/m^3$) | 380*[1] | 216*[1] | 339*[1] | 431*[1] | 274*[1] |
| Mill treatment | | | | | |
| Use or non-use of treatment | Non-used | Non-used | Non-used | Non-used | Non-used |
| Kind of mill | — | — | — | — | — |
| Kind of grinding media | — | — | — | — | — |
| Amount of raw material charged (g) | — | — | — | — | — |
| Treating time (h) | — | — | — | — | — |
| Properties of raw material after milling | | | | | |
| Cellulose I-type Crystallinity (%) | 47 | 71 | 54 | 67 | 71 |
| Occurrence of deposit after milling*[3] | — | — | — | — | — |
| Ratio of weight passed through 75 μm sieve to whole weight charged into mill (% by weight)*[4] | — | — | — | — | — |
| Average particle size (μm) | 85 | 93 | 82 | 72 | 71 |

TABLE 4-continued

| | Comparative Examples | | | | |
|---|---|---|---|---|---|
| | 13 | 14 | 15 | 16 | 17 |
| Kind of cellulose-containing raw material | News paper | Wood-free paper | News paper | Corrugated board | News paper |
| Use or non-use of shredder treatment | Used | Used | Used | Used | Used |
| *Twin-screw extruder treatment* | | | | | |
| Use or non-use of treatment | Used | Non-used | Non-used | Non-used | Non-used |
| Shear rate (sec$^{-1}$) | 660 | — | — | — | — |
| Average particle size (μm) | 61*$^1$ | — | — | — | — |
| Bulk density (kg/m$^3$) | 303*$^1$ | 32*$^2$ | 32*$^2$ | 33*$^2$ | — |
| *Mill treatment* | | | | | |
| Use or non-use of treatment | Non-used | Used | Used | Used | Used |
| Kind of mill | — | Agitation tank mill | Agitation tank mill | Agitation tank mill | Cutter mill |
| Kind of grinding media | — | 5 mmφ zirconia | 5 mmφ zirconia | 5 mmφ zirconia | — |
| Amount of raw material charged (g) | — | 22 | 23 | 20 | 500 |
| Treating time (h) | — | 2.5 | 2.5 | 2.5 | 1.5 |
| *Properties of raw material after milling* | | | | | |
| Cellulose I-type Crystallinity (%) | 58 | 0 | 0 | 0 | 62 |
| Occurrence of deposit after milling*$^3$ | — | None | None | None | — |
| Ratio of weight passed through 75 μm sieve to whole weight charged into mill (% by weight)*$^4$ | — | 85 | 89 | 86 | — |
| Average particle size (μm) | 61 | 28 | 23 | 23 | Flocculated |

| | Comparative Examples | | | | | |
|---|---|---|---|---|---|---|
| | 18 | 19 | 20 | 21 | 22 | 23 |
| Kind of cellulose-containing raw material | Corrugated board | Rice straws | Chaffs | News paper | Corrugated board | Wood-free paper |
| Use or non-use of shredder treatment | Used | Non-used | Non-used | Used | Used | Used |
| *Twin-screw extruder treatment* | | | | | | |
| Use or non-use of treatment | Non-used | Non-used | Non-used | Non-used | Non-used | Non-used |
| Shear rate (sec$^{-1}$) | — | — | — | — | — | — |
| Average particle size (μm) | — | — | — | — | — | — |
| Bulk density (kg/m$^3$) | — | — | — | — | — | — |
| *Mill treatment* | | | | | | |
| Use or non-use of treatment | Used | Used | Used | Used | Used | Used |
| Kind of mill | Cutter mill | Cutter mill | Cutter mill | Hammer mill | Hammer mill | Hammer mill |
| Kind of grinding media | — | — | — | — | — | — |
| Amount of raw material charged (g) | 500 | 500 | 500 | 500 | 500 | 500 |
| Treating time (h) | 1.5 | 0.5 | 0.5 | 0.5 | 0.5 | 0.5 |

TABLE 4-continued

| Properties of raw material after milling | | | | | | |
|---|---|---|---|---|---|---|
| Cellulose I-type Crystallinity (%) | 62 | 49 | 52 | 63 | 62 | 68 |
| Occurrence of deposit after milling*[3] | — | — | — | — | — | — |
| Ratio of weight passed through 75 μm sieve to whole weight charged into mill (% by weight)*[4] | — | — | — | — | — | — |
| Average particle size (μm) | (Flocculated) | (Coarse particles) | (Coarse particles) | (Flocculated) | (Flocculated) | (Flocculated) |

Note
*[1]Average particle size or bulk density of raw material after the twin-screw extruder treatment
*[2]Bulk density of pulp after the cutter mill treatment
*[3]Presence or non-presence of raw material deposited within the mill after the mill treatment
*[4]Weight ratio of undersize product of milled product passing through a 75 μm sieve which was obtained after the mill treatment From Tables 1 to 4, it was confirmed that the processes for production of the decrystallized celluloses according to Examples 1 to 13 were capable of producing a decrystallized cellulose having a reduced crystallinity in an efficient manner and were therefore excellent in productivity as compared to those according to Comparative Examples 1 to 23.

Example 2-2

[Shredder Treatment and Extruder Treatment]
The sheet-like pulp used in Example 1 was used as the cellulose-containing raw material and subjected to the shredder treatment and then to the twin-screw extruder treatment under the same conditions as used in Example 1. As a result, it was confirmed that the pulp obtained after the extruder treatment had an average particle size of 121 μm and a bulk density of 254 kg/m³.

[Vibration Mill Treatment]
One hundred grams of the resultant chipped pulp was charged into a vibration mill "MB-1" available from Chuo Kakohki Co., Ltd., (total container capacity: 3.5 L), and treated therein at a vibration amplitude of 8 mm and a circular rotation speed of 1200 cpm for 2 h under such a condition that 16 stainless steel rods each having a circular shape in section, a diameter of 25 mm and a length of 218 mm were filled in the vibration mill (filling ratio: 49%). The decrystallized cellulose obtained after the treatment using the vibration mill had an average particle size of 57 μm. Also, the temperature of the resultant decrystallized cellulose upon completion of the vibration mill treatment was as high as 85° C. owing to heat generated upon the treatment.

After completion of the treatment, no pulp deposited on the inner wall surface and bottom of the vibration mill was observed. The thus obtained decrystallized cellulose was taken out of the vibration mill and subjected to measurements of an average particle size and X-ray diffraction intensity thereof. The crystallinity of the decrystallized cellulose was calculated from the measured X-ray-diffraction intensity. The results are shown in Table 5.

Example 3-2

The same procedure as described in Example 2-2 was repeated except for filling 13 stainless steel rods each having a circular shape in section, a diameter of 30 mm and a length of 218 mm into the vibration mill (filling ratio: 57%) and operating the vibration mill for 1 h, thereby obtaining a decrystallized cellulose. The results are shown in Table 5.

Example 4-2

The same procedure as described in Example 2-2 was repeated except for filling the 14 stainless steel rods into the vibration mill (filling ratio: 62%), thereby obtaining a decrystallized cellulose. The results are shown in Table 5.

Example 5-2

The same procedure as described in Example 2-2 was repeated except for filling the 8 stainless steel rods each having a diameter of 36 mm and a length of 218 mm into the vibration mill (filling ratio: 51%) and operating the vibration mill for 1 h, thereby obtaining a decrystallized cellulose. The results are shown in Table 5.

Example 17-2

The same procedure as described in Example 2-2 was repeated except for filling the 11 stainless steel rods each having a diameter of 30 mm and a length of 218 mm into the vibration mill (filling ratio: 48%) and operating the vibration mill for 3 h, thereby obtaining a decrystallized cellulose. Meanwhile, the water content in the pulp obtained after the extruder treatment and upon being charged into the vibration mill was 4.1% by weight. The results are shown in Table 5.

TABLE 5

| | Examples | | | | |
|---|---|---|---|---|---|
| | 2-2 | 3-2 | 4-2 | 5-2 | 17-2 |
| Kind of cellulose-containing raw material | Pulp | Pulp | Pulp | Pulp | Pulp |

TABLE 5-continued

| | Examples | | | | |
|---|---|---|---|---|---|
| | 2-2 | 3-2 | 4-2 | 5-2 | 17-2 |
| Use or non-use of shredder treatment | Used | Used | Used | Used | Used |
| Twin-screw extruder treatment | | | | | |
| Use or non-use of treatment | Used | Used | Used | Used | Used |
| Shear rate (sec$^{-1}$) | 660 | 660 | 660 | 660 | 660 |
| Average particle size (μm) | 121*[1] | 121*[1] | 121*[1] | 121*[1] | 121*[1] |
| Bulk density (kg/m$^3$) | 254*[1] | 254*[1] | 254*[1] | 254*[1] | 254*[1] |
| Mill treatment | | | | | |
| Use or non-use of treatment | Used | Used | Used | Used | Used |
| Kind of mill | Vibration mill | Vibration mill | Vibration mill | Vibration mill | Vibration mill |
| Shape of grinding media in container | Rod (cylindrical shape) | Rod (cylindrical shape) | Rod (cylindrical shape) | Rod (cylindrical shape) | Rod (cylindrical shape) |
| Diameter of rod (mm) | 25 | 30 | 25 | 36 | 30 |
| Number of rods | 16 | 13 | 14 | 8 | 11 |
| Amount of pulp charged (g) | 100 | 100 | 100 | 100 | 100 |
| Treating time (h) | 2 | 1 | 2 | 1 | 3 |
| Evaluation | | | | | |
| Cellulose I-type Crystallinity (%) | 0 | 0 | 0 | 0 | 0 |
| Occurrence of deposit after milling*[2] | None | None | None | None | None |
| Average particle size of decrystallized cellulose (μm)*[3] | 57 | 68 | 88 | 55 | 57 |

Note
*[1]Average particle size or bulk density of pulp after the twin-screw extruder treatment
*[2]Presence or non-presence of pulp deposited within the vibration mill after the vibration mill treatment
*[3]Average particle size of decrystallized cellulose obtained after the vibration mill treatment Example 6-2

The same vibration mill treatment as described in Example 2-2 was conducted except for using 78 g of the coarsely milled cellulose-containing raw material (crystallinity: 84%; bulk density: 111 kg/m$^3$) obtained by subjecting the corrugated board used in Example 4 to the same shredder treatment, filling the 10 stainless steel rods each having a circular shape in section, a diameter of 30 mm and a length of 218 mm into the vibration mill (filling ratio: 44%), and operating the vibration mill for 2 h, thereby obtaining a decrystallized cellulose. The results are shown in Table 6.

Example 10-2

The chaffs used in Example 6 were used as the cellulose-containing raw material and subjected to the same twin-screw extruder treatment as described in Example 2-2, thereby obtaining a powdered cellulose-containing raw material. The powdered cellulose-containing raw material obtained after the twin-screw extruder treatment had a crystallinity of 47%.

Next, 100 g of the thus obtained powdered cellulose-containing raw material was subjected to the same vibration mill treatment as described in Example 6-2 except for filling the 11 stainless steel rods each having a circular shape in section, a diameter of 30 mm and a length of 218 mm into the vibration mill (filling ratio: 48%), thereby obtaining a decrystallized cellulose. The results are shown in Table 6.

Example 11-2

The news paper used in Example 9 was used as the cellulose-containing raw material and successively subjected to the same shredder treatment and twin-screw extruder treatment as described above, thereby obtaining a powdered cellulose-containing raw material. The powdered cellulose-containing raw material obtained after the twin-screw extruder treatment had a crystallinity of 56%.

Next, the thus obtained powdered cellulose-containing raw material was subjected to the vibration mill treatment under the same conditions as used in Example 10-2, thereby obtaining a decrystallized cellulose. The results are shown in Table 6.

Example 12-2

The magazines used in Example 13 were used as the cellulose-containing raw material and successively subjected to the same shredder treatment and twin-screw extruder treatment as described in Examples 11-2, thereby obtaining a powdered cellulose-containing raw material. The powdered cellulose-containing raw material obtained after the twin-screw extruder treatment had a crystallinity of 67%. Next, the thus obtained powdered cellulose-containing raw material was subjected to the vibration mill treatment under the same conditions as used in Example 10-2, thereby obtaining a decrystallized cellulose. The results are shown in Table 6.

Example 13-2

The wood-free paper used in Example 8 was used as the cellulose-containing raw material and successively subjected to the same shredder treatment and twin-screw extruder treatment as described in Example 11-2, thereby obtaining a powdered cellulose-containing raw material. The powdered cellulose-containing raw material obtained after the twin-screw extruder treatment had a crystallinity of 67%. Next, the thus obtained powdered cellulose-containing raw material was subjected to the vibration mill treatment under the same conditions as used in Example 10-2, thereby obtaining a decrystallized cellulose. The results are shown in Table 6.

Example 14-2

Five hundred grams of the chaffs used in Example 10 as the cellulose-containing raw material were charged into a hammer mill "SAMPLE-MILL" available from Dalton Co., Ltd., and treated therein at a rotating speed of 13500 rpm for 0.5 h. The thus treated cellulose-containing raw material had a bulk density of 380 kg/m³ and an average particle size of 148 μm. Next, the cellulose-containing raw material was subjected to the vibration mill treatment under the same conditions as used in Example 10-2, thereby obtaining a decrystallized cellulose. Meanwhile, the water content in the cellulose-containing raw material obtained after the hammer mill treatment and upon being charged into the vibration mill was 8.6% by weight. The results are shown in Table 6.

Example 15-2

Five hundred grams of the rice straws used in Example 5 as the cellulose-containing raw material were charged into a hammer mill "SAMPLE-MILL" available from Dalton Co., Ltd., and treated therein at a rotating speed of 13500 rpm for 0.5 h. The thus treated cellulose-containing raw material had a bulk density of 176 kg/m³ and an average particle size of 148 μm. Next, the cellulose-containing raw material was subjected to the vibration mill treatment under the same conditions as used in Example 10-2, thereby obtaining a decrystallized cellulose. Meanwhile, the water content in the cellulose-containing raw material obtained after the hammer mill treatment and upon being charged into the vibration mill was 6.5% by weight. The results are shown in Table 6.

Example 16-2

Five hundred grams of coconut fibers (cellulose content: 63% by weight; water content: 7.4% by weight; size: about 5 cm×5 cm×5 cm) were used as the cellulose-containing raw material, and subjected to the same twin-screw extruder treatment as described in Example 2-2, thereby obtaining a powdered cellulose-containing raw material. The crystallinity of the cellulose-containing raw material obtained after the twin-screw extruder treatment was 42%.

Next, the same vibration mill treatment as described in Example 6-2 was conducted except for using 40 g of the thus obtained cellulose-containing raw material and filling the rods into the vibration mill (filling ratio: 44%), thereby obtaining a decrystallized cellulose. The results are shown in Table 6.

TABLE 6

| | Examples | | | |
|---|---|---|---|---|
| | 6-2 | 10-2 | 11-2 | 12-2 |
| Kind of cellulose-containing raw material | Corrugated board | Chaffs | News paper | Magazines |
| Use or non-use of shredder treatment | Used | Non-used | Used | Used |
| Twin-screw extruder treatment | | | | |
| Use or non-use of treatment | Non-used | Used | Used | Used |
| Shear rate (sec$^{-1}$) | — | 660 | 660 | 660 |
| Average particle size (μm) | — | 85*[1] | 61*[1] | 72*[1] |
| Bulk density (kg/m³) | 111*[6] | 380*[1] | 303*[1] | 431*[1] |
| Pretreatment other than twin-screw extruder treatment | Non-used | Non-used | Non-used | Non-used |
| Mill treatment | | | | |
| Use or non-use of treatment | Used | Used | Used | Used |
| Kind of mill | Vibration mill | Vibration mill | Vibration mill | Vibration mill |
| Shape of grinding media in container | Rod | Rod | Rod | Rod |
| Diameter of rod (mm) | 30 | 30 | 30 | 30 |
| Number of rods | 10 | 11 | 11 | 11 |
| Amount of raw material charged (g) | 78 | 100 | 100 | 100 |
| Treating time (h) | 2 | 2 | 2 | 2 |

TABLE 6-continued

| Properties of raw material after milling*3 | | | | |
|---|---|---|---|---|
| Cellulose I-type Crystallinity (%) | 0 | 0 | 0 | 5 |
| Occurrence of deposit after treatment*2 | None | None | None | None |
| Average particle size of raw material after milling (μm) | 61 | 48 | 55 | 38 |

| | Examples | | | |
|---|---|---|---|---|
| | 13-2 | 14-2 | 15-2 | 16-2 |
| Kind of cellulose-containing raw material | Wood-free paper | Chaffs | Rice straws | Coconut fibers |
| Use or non-use of shredder treatment | Used | Non-used | Non-used | Used |
| Twin-screw extruder treatment | | | | |
| Use or non-use of treatment | Used | Non-used | Non-used | Used |
| Shear rate (sec$^{-1}$) | 660 | — | — | 660 |
| Average particle size (μm) | 71*1 | 148*5 | 148*5 | 204*1 |
| Bulk density (kg/m$^3$) | 274*1 | 380*5 | 176*5 | 152*1 |
| Pretreatment other than twin-screw extruder treatment | Non-used | Used*4 | Used*4 | Non-used |
| Mill treatment | | | | |
| Use or non-use of treatment | Used | Used | Used | Used |
| Kind of mill | Vibration mill | Vibration mill | Vibration mill | Vibration mill |
| Shape of grinding media in container | Rod | Rod | Rod | Rod |
| Diameter of rod (mm) | 30 | 30 | 30 | 30 |
| Number of rods | 11 | 11 | 11 | 10 |
| Amount of raw material charged (g) | 100 | 100 | 100 | 40 |
| Treating time (h) | 2 | 2 | 2 | 2 |
| Properties of raw material after milling*3 | | | | |
| Cellulose I-type Crystallinity (%) | 0 | 12 | 8 | 21 |
| Occurrence of deposit after treatment*2 | None | None | None | None |
| Average particle size of raw material after milling (μm) | 42 | 52 | 40 | 76 |

Note
*1 Average particle size or bulk density of raw material after the twin-screw extruder treatment
*2 Presence or non-presence of raw material deposited within the vibration mill after the vibration mill treatment
*3 Properties of raw material obtained after the vibration mill treatment
*4 Hammer mill treatment
*5 Average particle size or bulk density of raw material after the hammer mill treatment
*6 Bulk density of raw material after the shredder treatment From Tables 3 to 6, it was confirmed that the processes for production of the decrystallized celluloses according to Examples 2-2 to 17-2 were capable of producing a decrystallized cellulose having a reduced crystallinity in an efficient manner and were therefore excellent in productivity as compared to those according to Comparative Examples 1 to 23. In addition, from the comparison between Example 2-2 and Comparative Example 1, it was confirmed that the process using the rods as the grinding media for the vibration mill according to the present invention was capable of producing such a decrystallized cellulose whose crystallinity was reduced to 0%, in an efficient manner.

INDUSTRIAL APPLICABILITY

The process for producing a decrystallized cellulose according to the present invention is excellent in productivity, and enables a decrystallized cellulose whose cellulose I-type crystallinity is reduced to 33% or less to be produced in an efficient manner. The thus produced decrystallized cellulose of the present invention is especially useful as industrial materials such as raw materials of cellulose ethers, cosmetics, food stuffs and biomass materials.

The invention claimed is:

1. A process for producing a decrystallized cellulose from a raw material comprising at least 20% by weight, based on the weight of the raw material excluding water contained therein, of a cellulose having a cellulose I-type crystallinity of more than 33% as calculated from formula (1):

$$\text{Cellulose } I\text{-type Crystallinity } (\%) = [(I_{22.6} - I_{18.5})/I_{22.6}] \times 100 \quad (1)$$

wherein $I_{22.6}$ is a diffraction intensity of a lattice plane (002 plane) as measured at a diffraction angle 2θ of 22.6° in X-ray diffraction analysis; and $I_{18.5}$ is a diffraction intensity of an amorphous moiety as measured at a diffraction angle 2θ of 18.5° in X-ray diffraction analysis, said process comprising treating the raw material using a vibration mill with rods as grinding media to reduce the cellulose I-type crystallinity of the cellulose to 33% or less, wherein the raw material has a bulk density of from 100 to 500 kg/m³, wherein the rods each have an outer diameter of from 5 to 50 mm.

2. The process according to claim 1, wherein the raw material has an average particle size of from 0.01 to 1 mm.

3. The process according to claim 2, wherein the average particle size is from 0.01 to 0.7 mm.

4. The process according to claim 2, wherein the average particle size is from 0.05 to 0.5 mm.

5. The process according to claim 1, wherein the raw material is a material treated by an extruder.

6. The process according to claim 5, wherein the extruder is a twin-screw extruder.

7. The process according to claim 1, wherein the raw material is a pulp.

8. The process according to claim 1, wherein the decrystallized cellulose has a crystallinity of 20% or less.

9. The process according to claim 1, wherein the decrystallized cellulose has a crystallinity of 10% or less.

10. The process according to claim 1, wherein the decrystallized cellulose has a crystallinity of 0%.

11. The process according to claim 1, wherein the raw material has a bulk density of from 120 to 400 kg/m³.

12. The process according to claim 1, wherein the raw material has a bulk density of from 150 to 350 kg/m³.

13. The process according to claim 1, wherein the rods have a filling ratio of from 10 to 97%.

14. The process according to claim 1, wherein said treating is carried out for from 0.01 to 50 h.

15. The process according to claim 1, wherein the decrystallized cellulose has an average particle size of from 25 to 150 μm.

* * * * *